United States Patent
Bangura

(10) Patent No.: US 8,922,154 B2
(45) Date of Patent: Dec. 30, 2014

(54) BRUSHLESS STARTER-GENERATOR ASSEMBLY AND METHOD TO CONTROL MAGNETIC FLUX EXCITATION

(75) Inventor: John F. Bangura, Rockton, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 156 days.

(21) Appl. No.: 13/350,084

(22) Filed: Jan. 13, 2012

(65) Prior Publication Data

US 2013/0181653 A1    Jul. 18, 2013

(51) Int. Cl.
*H02P 7/18* (2006.01)
*H02K 19/26* (2006.01)
*H02K 21/04* (2006.01)
*H02K 19/12* (2006.01)

(52) U.S. Cl.
USPC ........... 318/717; 310/103; 310/104; 310/170; 310/433

(58) Field of Classification Search
USPC ...................................... 322/1–98
See application file for complete search history.

(56) References Cited

U.S. PATENT DOCUMENTS

| | | | |
|---|---|---|---|
| 6,455,975 B1 | 9/2002 | Raad et al. | |
| 6,844,707 B1 * | 1/2005 | Raad | 322/29 |
| 6,992,403 B1 * | 1/2006 | Raad | 307/47 |
| 7,242,167 B2 | 7/2007 | Patterson | |
| 7,385,332 B2 | 6/2008 | Himmelmann et al. | |
| 7,557,482 B2 * | 7/2009 | Aydin et al. | 310/156.32 |
| 7,579,812 B2 | 8/2009 | Dooley | |
| 7,834,509 B2 * | 11/2010 | Legros et al. | 310/261.1 |
| 7,859,231 B2 | 12/2010 | Gieras et al. | |
| 8,330,317 B2 * | 12/2012 | Burch et al. | 310/156.55 |
| 2006/0145555 A1 * | 7/2006 | Petro et al. | 310/156.38 |
| 2010/0253163 A1 * | 10/2010 | Lafontaine et al. | 310/58 |
| 2010/0264759 A1 * | 10/2010 | Shafer et al. | 310/54 |
| 2011/0095642 A1 * | 4/2011 | Enomoto et al. | 310/216.045 |
| 2011/0121677 A1 * | 5/2011 | Ley et al. | 310/156.53 |
| 2011/0298310 A1 * | 12/2011 | Ross et al. | 310/20 |
| 2012/0126731 A1 * | 5/2012 | Wyrembra | 318/400.14 |
| 2012/0159983 A1 * | 6/2012 | Tsutsumi et al. | 62/498 |
| 2013/0193957 A1 * | 8/2013 | Zhou | 324/207.16 |

OTHER PUBLICATIONS

Afjei, E.; Toliyat, H.; Moradi, H., "A Novel Hybrid Brushless dc motor/Generator for Hybrid Vehicles Applications," Power Electronics, Drives and Energy Systems, 2006. PEDES '06. International Conference on , vol., No., pp. 1,6, Dec. 12-15, 2006 URL: http://ieeexplore.ieee.org/stamp/stamp.jsp?tp=&arnumber=4147861&isnumber=4147830.*

* cited by examiner

*Primary Examiner* — Eduardo Colon Santana
*Assistant Examiner* — Said Bouziane
(74) *Attorney, Agent, or Firm* — Cantor Colburn LLP

(57) ABSTRACT

A brushless starter-generator assembly includes a stator assembly, a rotor including a magnetic hub, the rotor disposed at least partially within the stator assembly and configured to rotate about an axis, and a field coil located radially outward from the rotor with respect to the axis.

19 Claims, 9 Drawing Sheets

BRUSHLESS STARTER-GENERATOR ASSEMBLY AND METHOD TO CONTROL MAGNETIC FLUX EXCITATION

BACKGROUND OF THE INVENTION

Embodiments of the present invention pertain to the art of power generation devices, and in particular, to brushless starter generators.

Certain power generation applications, such as aerospace power generation applications, require that highly regulated electrical power be delivered from a power generation system having a rotor that rotates over a wide range of speeds to a wide range of loads. Wound field synchronous generators may be used to generate power and receive rotational power from either a high-pressure or high-speed spool of a gas turbine engine. However, in such cases, a reduction gearbox is required between the spool of the gas turbine engine and the generator.

Permanent magnet starter-generators may also be used to generate power, and can be directly connected to high-pressure or high-speed engine spools. However, conventional high-pressure connected and high-speed connected permanent magnet starter-generators are unable to effectively regulate the induced electromagnetic fields (EMF) and output voltages of the starter-generator.

BRIEF DESCRIPTION OF THE INVENTION

Disclosed is a brushless starter-generator assembly including a stator assembly, a rotor including a magnetic hub, the rotor configured to rotate about an axis, and a field coil located radially outward from the rotor with respect to the axis.

Also disclosed is a system including a brushless starter-generator assembly and a control circuit. The brushless starter-generator assembly may include a stator assembly, a rotor including a magnetic hub, the rotor configured to rotate about an axis, and a field coil located radially outward from the rotor with respect to the axis. The control circuit may control a current supplied to the field coil.

Also disclosed is a method including rotating a rotor assembly about an axis with respect to a stator assembly to generate an electromagnetic field (EMF), the rotor including a magnetic hub; and adjusting power supplied to a field coil surrounding the axis to adjust a magnetic reluctance of the magnetic hub.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus are presented herein by way of exemplification and not limitation with reference to the Figures.

Figure 1:
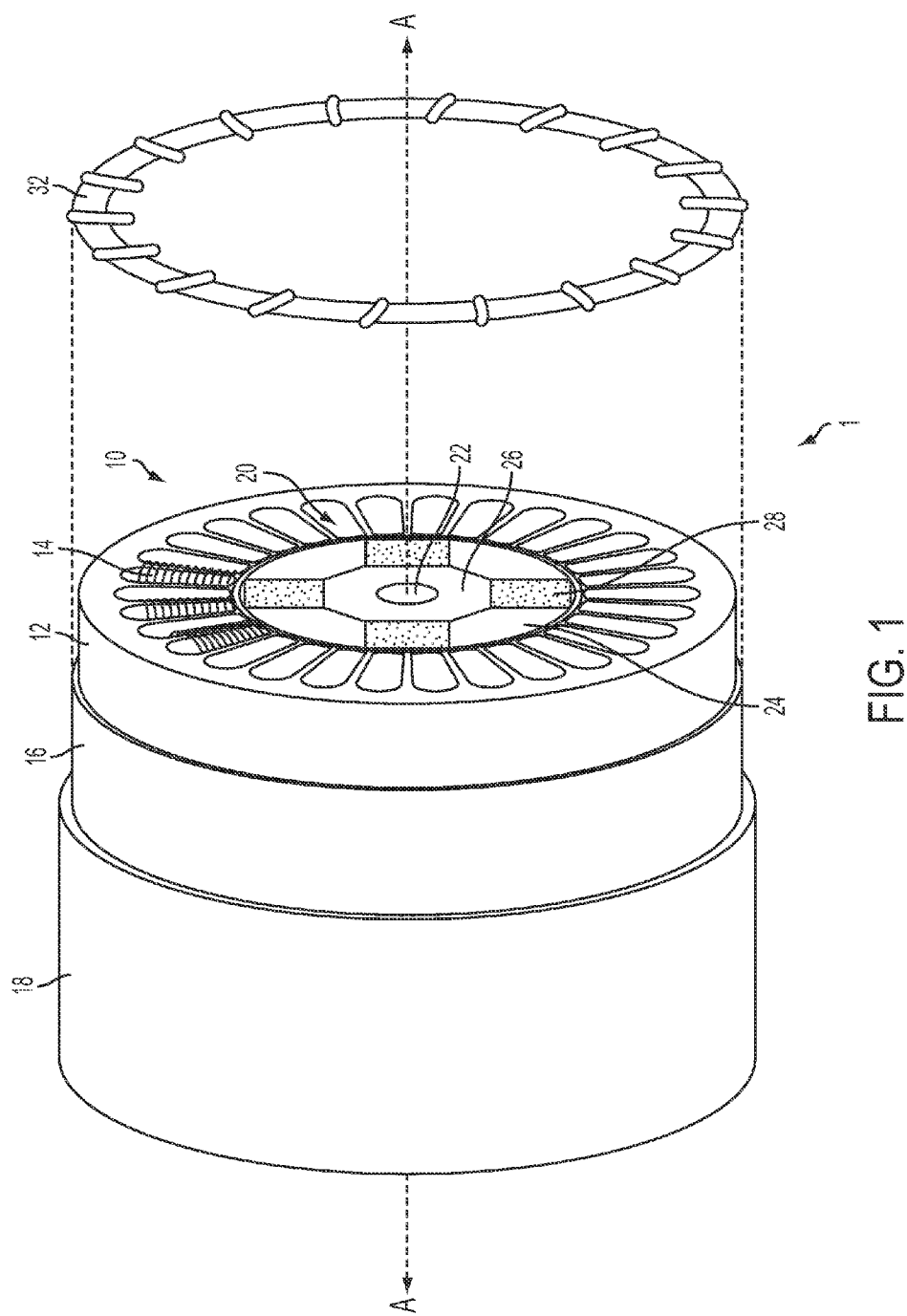
FIG. 1 is an exploded perspective view of a brushless starter-generator assembly according to an embodiment of the present invention.

FIG. 1 illustrates a brushless starter-generator assembly 1 (also referred to as "assembly 1") according to an embodiment of the present invention. The assembly 1 includes a stator assembly 10 surrounding a rotor 20. The stator assembly 10 is a stationary assembly, and the rotor 20 rotates with respect to the stator assembly 10. At least one field coil 32 is located radially outward from the rotor 20. For example, in the embodiment of FIG. 1, a field coil 32 is located radially outward from the rotor 20 with respect to an axis A.

The rotor 20 includes a shaft 22, protrusions 24, and permanent magnets 28 positioned between the protrusions 24. The protrusions 24 are also referred to in the present specification and claims as rotor poles, laminated poles, laminated rotor poles, and poles 24. The permanent magnets are also referred to in the specification and claims as magnets 28. The poles 24 and permanent magnets 28 are fixed with respect to the shaft 22 and rotate about the shaft 22 as it rotates about the axis A. The rotor 20 also includes a magnetic hub 26 surrounding the shaft 22 in a radial direction with respect to the axis A and located between the shaft 22 and the magnets 28.

The stator assembly 10 includes a stator stack 12 and one or more windings 14 wound in the stator stack 12. The windings 14 comprise conductive wire wound to generate and/or receive an electromagnetic field (EMF). Only some windings 14 of the stator 10 are illustrated in FIG. 1 for purposes of ease of description. However, any number of windings 14 may be implemented according to the desired specifications of the brushless starter-generator assembly 1. The stator assembly 10 further includes a magnetic sleeve 18 around an outer circumference of the stator stack 12, and a non-magnetic separator 16 between the magnetic sleeve 18 and the stator stack 12.

The brushless starter-generator assembly 1 may regulate an induced electromagnetic field (EMF) in the windings 14 by regulating a flux produced by the permanent magnets 28 of the rotor 20. Compared to systems that regulate induced EMF by regulating the stator assembly 10, the brushless starter-generator assembly 1 of the embodiment of FIG. 1 may result in an increase in voltage regulation by a factor of 10 or more, with only a marginal increase in a weight of the brushless starter-generator assembly 1.

Figure 6:
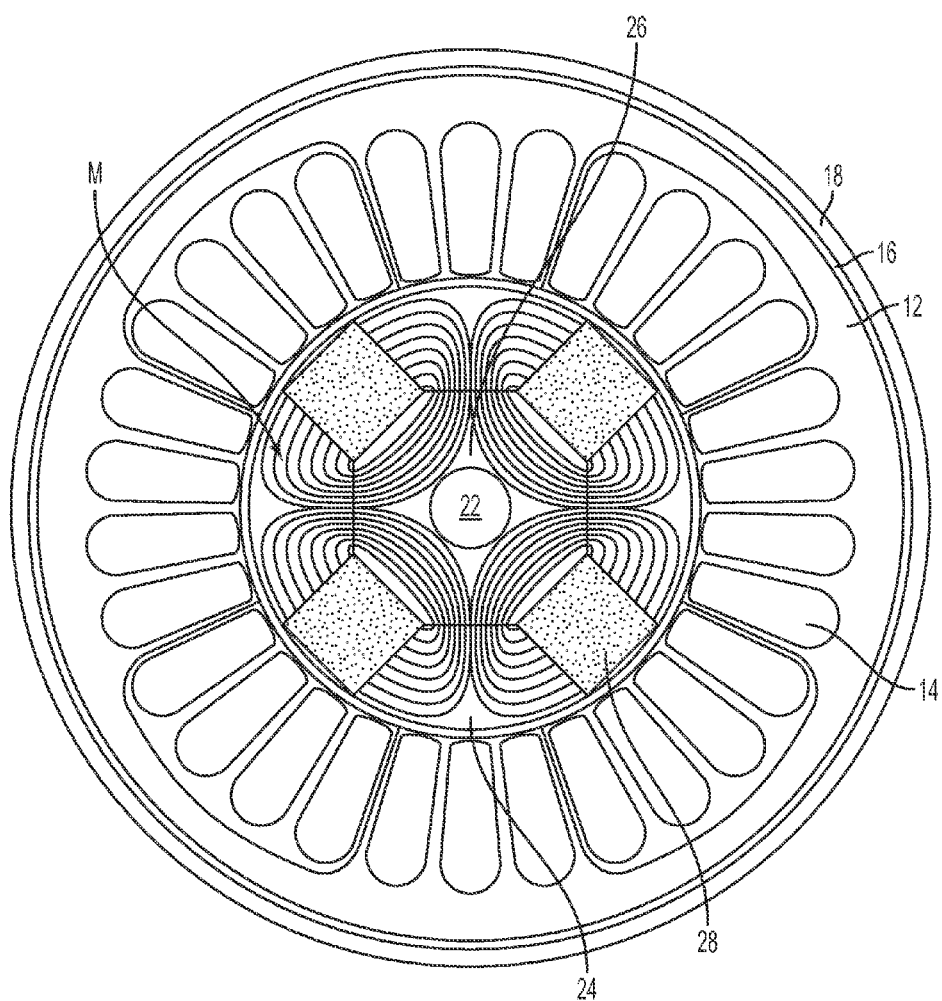
FIGS. 6 and 7 illustrate excitation states of a brushless starter-generator assembly according to embodiments of the present invention.

The field coil 32 generates a magnetic field to vary the magnetic saturation, and the magnetic reluctance, of the magnetic hub 26. By varying the magnetic flux output from the field coils coil 32, the magnetic reluctance of the magnetic hub 26 may be adjusted. Referring to FIG. 6, when no magnetic field is generated in the field coil 32, the magnetic hub 26 maintains a low magnetic saturation, a low magnetic reluctance, and a high magnetic permeability, and the magnetic flux generated by the permanent magnets 28 is substantially maintained within the rotor 10.

Figure 7:
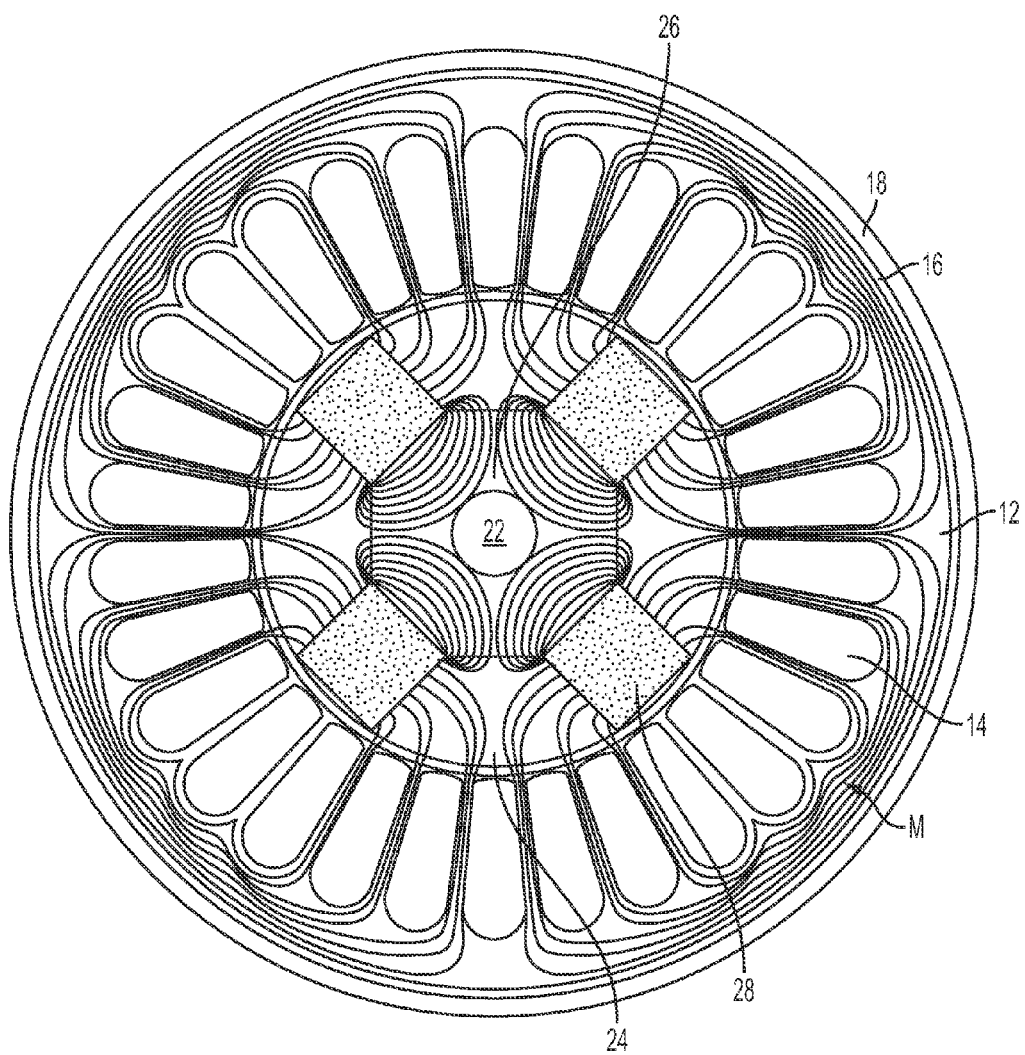

Referring to FIG. 7, when the magnetic saturation level or magnetic flux density generated by the field coil 32 is increased, the magnetic permeability of the magnetic hub 26 decreases. Because the magnetic permeability of the magnetic hub 26 is decreased, the laminated rotor poles 24 have a relatively higher magnetic permeability, and the magnetic flux generated by the permanent magnets 28 flows through the more permeable regions of the laminated rotor poles 24 to cross the air gap 29 to the windings 14 of the stator 10. As a result, the percentage of permanent magnet flux linking the stator windings 14 increases, and the current generated in the windings 14 increases. In other words, the magnetic hub 26 on the rotor 20 and field coil 32 located radially outward from the magnetic hub 26 provide a means to control the EMF of the permanent magnets 28 of the rotor 20, an EMF induced in the windings 14, and a voltage output from the brushless starter-generator assembly 1 via the windings 14.

The magnetic flux produced by the field coils 32a and 32b is forced to flow axially through the magnetic hub 26 and return through the magnetic sleeve 18 by positioning the non-magnetic separator 16 between the magnetic sleeve 18 and the stator stack 12. The non-magnetic separator 16 prevents the magnetic flux produced by the field coils 32a and 32b from flowing from the magnetic hub 26 through the laminated rotor poles 24 and through the stator stack 12.

Figure 2:
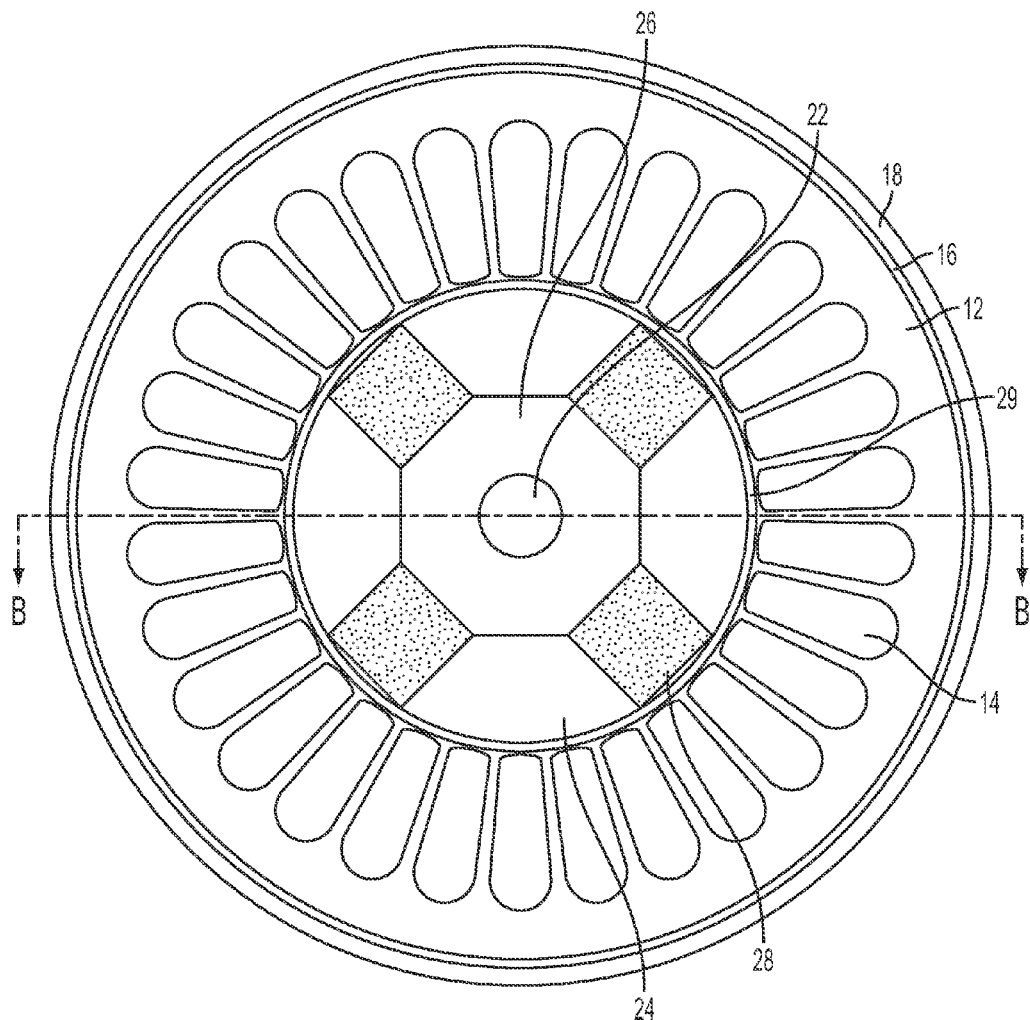
FIG. 2 is a cross-section view of a brushless starter-generator assembly according to one embodiment.

FIG. 2 illustrates a cross-section of the stator assembly 10 and rotor 20 according to an embodiment of the present invention. The stator assembly 10 includes a stator stack 12, windings 14, a magnetic sleeve 18 surrounding an outer circumference of the stator stack 12, and a non-magnetic separator 16 located between the stator stack 12 and the magnetic sleeve 18. The rotor 20 includes a shaft 22, rotor poles 24 extending radially from the shaft 22, and permanent magnets 28 located between, or embedded in, the rotor poles 24. A magnetic hub 26 surrounds the shaft 22 and is located between the shaft 22 and the rotor poles 24.

Figure 3:
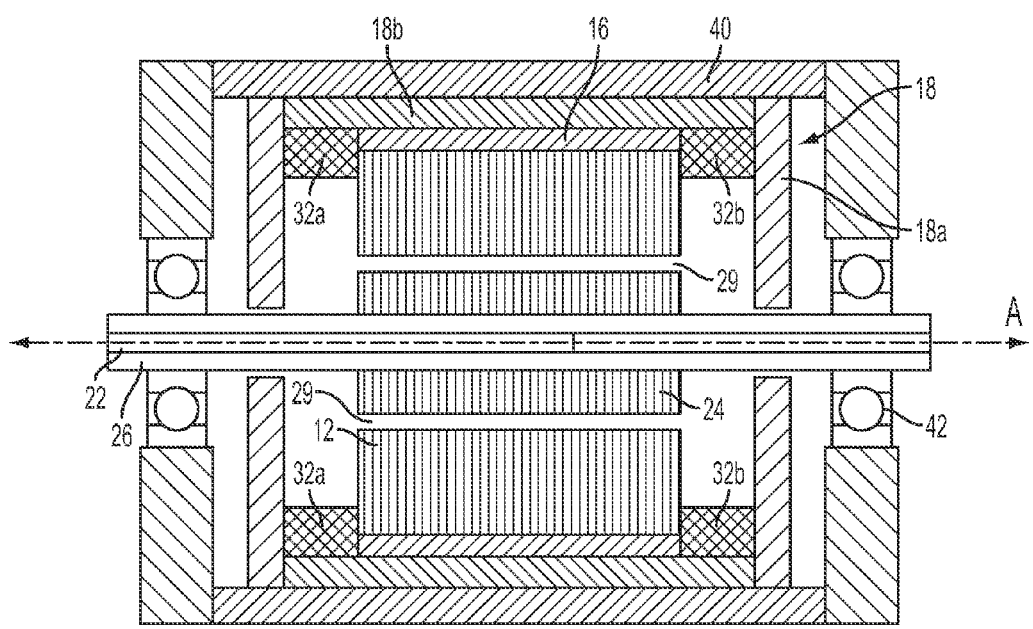
FIG. 3 is another cross-section view of a brushless starter-generator assembly according to one embodiment.

FIG. 3 illustrates a cross-section view of the brushless starter-generator assembly 1 of FIG. 2, taken along the line B-B'. The brushless starter-generator assembly 1 may include a main housing 40 surrounding the stator assembly 10 and the rotor 20. The stator assembly 10 may be fixed with respect to the main housing 40, and bearings 42 may be positioned between the main housing 40 and the shaft 22 to support the shaft 22 and to allow the shaft 22 to rotate with respect to the main housing 40. In the present embodiment, the magnetic hub 26 may be located between the shaft 22 and the bearings 42 to support the magnetic hub 26 and to allow the magnetic hub 26 to rotate with respect to the main housing 40. In one embodiment, the main housing 40 has a cylindrical shape having openings at the ends of the cylinder to allow the magnetic hub 26 and shaft 22 to pass therethrough, and the bearings 42 may be located at the openings.

The stator assembly 10 may include a magnetic sleeve 18 having radial portions 18a extending radially from the magnetic hub 26, and a length portion 18b extending lengthwise along an outer radial end of the stator stack 12, parallel to the axis A. Ends of the radial portions 18a may be spaced apart from the magnetic hub 26. In one embodiment, the magnetic sleeve 18 has a cylindrical shape, the radial portions 18a comprise circular ends of the cylinder having openings to allow the magnetic hub 26 and shaft 22 to pass therethrough, and the length portion 18b comprises the cylindrical sides of the cylinder. In one embodiment, the ends of the radial portions 18a extend toward the magnetic hub 26, past an outer circumference of the rotor poles 24 in a radial direction with respect to the axis A.

A non-magnetic separator 16 may be positioned between the length portion 18b of the magnetic sleeve 18 and the stator stack 12. In one embodiment, the non-magnetic separator 16 has a substantially cylindrical shape.

In the embodiment of FIG. 3, the field coil 32 includes first and second field coils 32a and 32b located radially outward from the rotor 20 on either side of the stator stack 12 in a direction of the axis A, or in other words, in a longitudinal direction. The field excitation coils 32a and 32b may be connected in series so that an appropriate combination of a high number of turns and a low current may create the magnetomotive force to produce a level of axial magnetic flux that flows through the rotor hub and returns through the magnetic sleeve 18 around the stator assembly 10. In the embodiment of FIG. 3, the field coils 32a and 32b are positioned between the stator stack 12 and the radial portions 18 of the magnetic sleeve 18. The field coils 32a and 32b may have O shapes centered around a point on the axis A. An outer circumference of the field coils 32a and 32b may contact an inner circumference of the length portion 18b of the magnetic hub 18.

The field coils 32a and 32b surround at least portions of the stator assembly 10. For example, referring to FIG. 3, the field coils 32a and 32b are located to cover or surround longitudinal side surfaces of the stator stack 12 and the non-magnetic separator 16. In other words, in the present specification and claims, the term "surrounding" includes covering an element in a longitudinal direction. The term "surrounding" may include in addition or in the alternative, covering an element in a radial direction. The term surrounding at least a portion includes covering a portion of an element, and may include covering only a part of an element or covering the entire element.

In the embodiment of FIG. 3, the field coils 32a and 32b are located radially outward from the rotor poles 24 and permanent magnets 28, and are offset from the rotor poles 24 in the longitudinal direction toward the ends of the brushless starter-generator assembly 1. In alternative embodiments, the field coil 32 may be located directly radially outward from the permanent magnets 28. In other words, the field coils 32 may not be axially offset from the permanent magnets.

Figure 4:
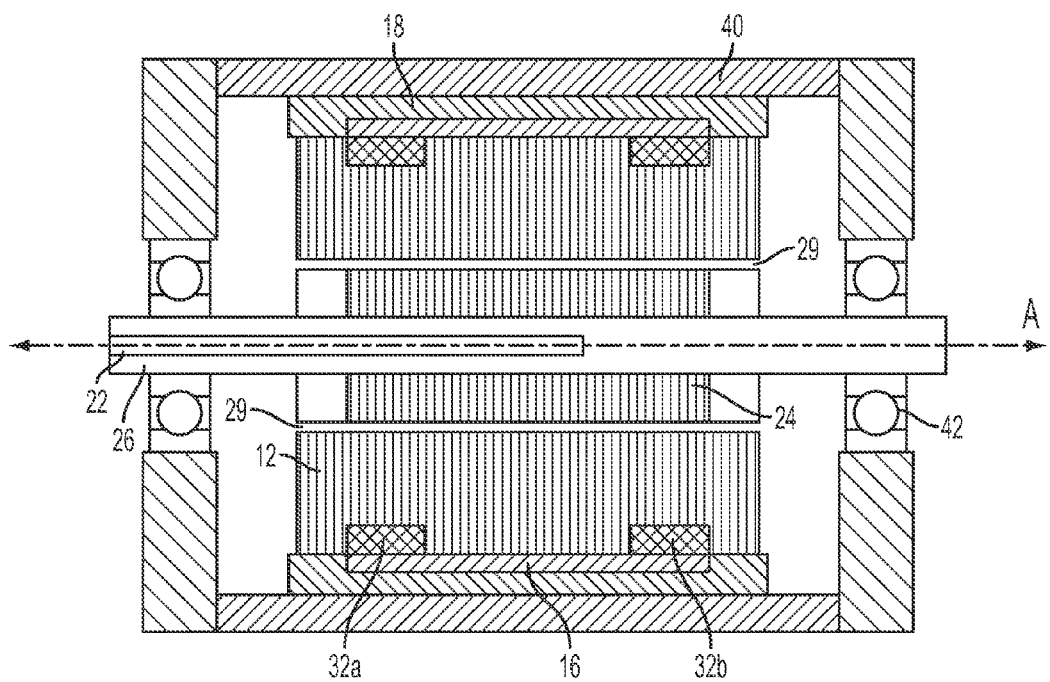
FIG. 4 is a cross-section view of a brushless starter-generator assembly according to another embodiment.

FIG. 4 illustrates an embodiment of the present invention including field coils 32a and 32b that are located directly radially outward from the rotor poles 24 and the permanent magnets 28. In the embodiment of FIG. 4, field coils 32a and 32b are located within the stator stack 24. For example, according to one embodiment, grooves may be formed in the stator stack 12, and the field coils 32a and 32b may be formed in the grooves. However, any method may be used to locate the field coils 32a and 32b within the stator stack 12.

The field coils 32a and 32b may have outer circumferences contacting an inner circumference of the non-magnetic separator 16. In one embodiment, the magnetic sleeve 18 may not include radial portions 18a, and may instead include only a length portion 18b. The field coils 32a and 32b may be located closer to opposite ends of the stator stack 12 in a direction of the axis A, or in other words in a longitudinal direction, than to a center of the stator stack 12 in the longitudinal direction. In one embodiment, the field coils 32a and 32b are adjacent to ends of the non-magnetic separator 16 in the longitudinal direction.

Figure 5:
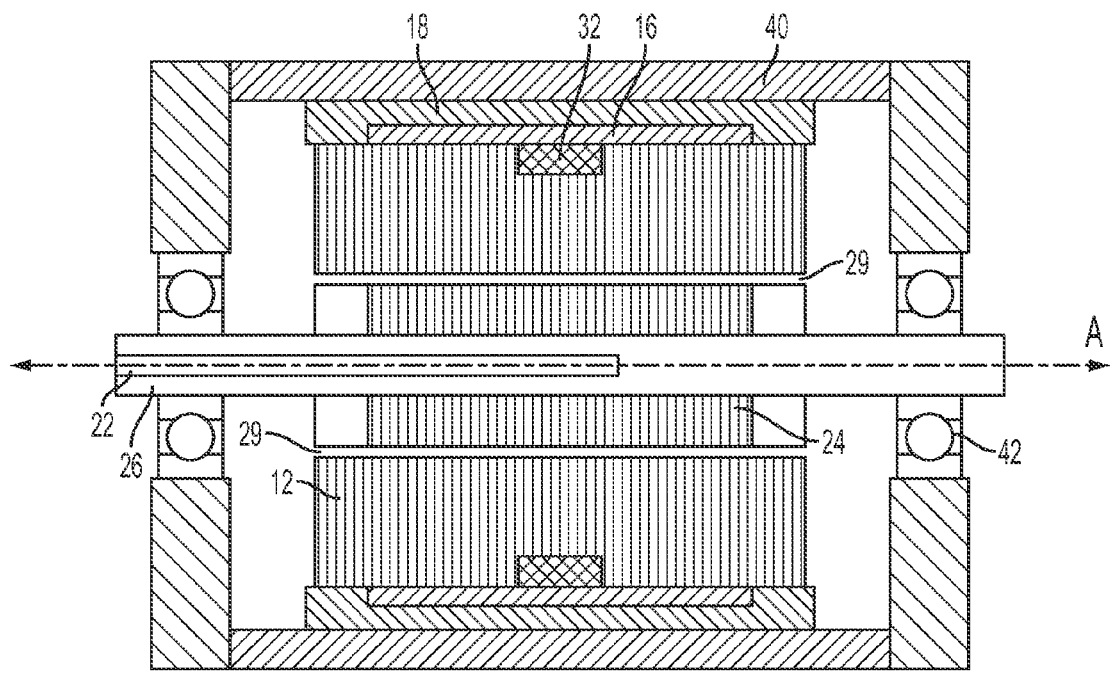
FIG. 5 is a cross-section view of a brushless starter-generator assembly according to yet another embodiment.

According to some embodiments, a number of field coils 32 may be greater than two, or less than two. FIG. 5 illustrates an embodiment in which only one field coil 32 is located in the brushless starter-generator assembly 1. The field coil 32 is located within the stator stack 12 at a center point of the stator stack 12 in the direction of the axis A, or in other words, at a longitudinal center of the stator stack 12. The field coil 32 may have an outer circumference contacting an inner circumference of the non-magnetic separator 16. In the embodiment of FIG. 5, the magnetic sleeve 18 does not include radial portions 18a. Instead, the magnetic sleeve 18 may include only a length portion 18b.

Figure 8:
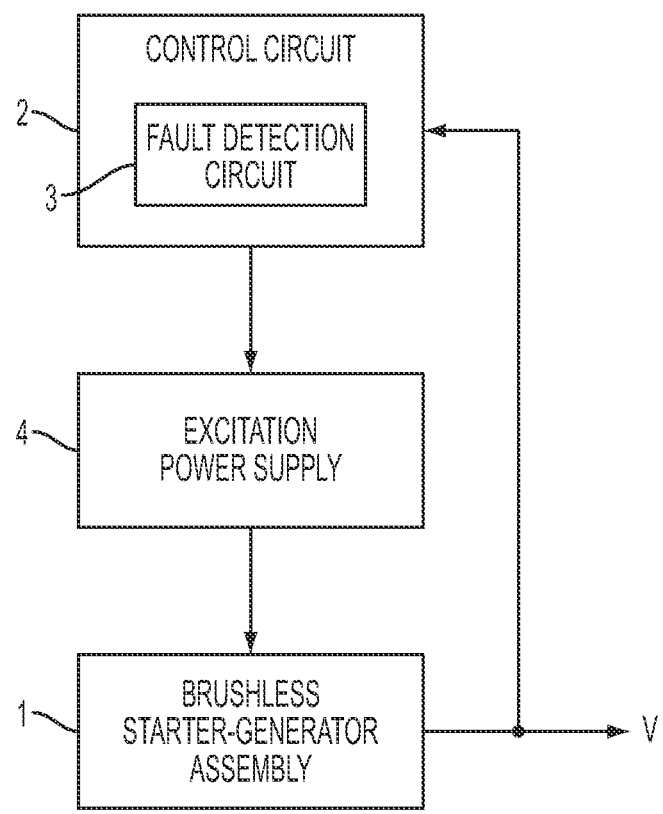
FIG. 8 illustrates a system to control a brushless starter-generator assembly according any of the embodiments of the present invention.

FIG. 8 illustrates a system for controlling the voltage output from a brushless starter-generator assembly 1 by controlling the EMF induced in windings 14 according to embodiments of the present invention. The system of FIG. 8 will be described with reference to the elements of the brushless starter-generator assembly 1 of the embodiment of FIG. 1.

The system includes the brushless starter-generator assembly 1 to generate an output voltage V based upon the rotation of the rotor 20. A control circuit 2 controls an excitation power supply 4, which provides power to the field coil 32. When current is increased to the field coil, the magnetic saturation of the magnetic hub 26 increases, and the magnetic permeability of the magnetic hub 26 decreases. Consequently, the magnetic flux produced by the permanent magnets 28 flows through the rotor poles 24 to the windings 14 of the stator 10, and the voltage output from the brushless starter-generator assembly 1 increases.

Conversely, when the current is decreased to the field coil 32, the magnetic saturation of the magnetic hub 26 decreases, the magnetic permeability increases, and the magnetic flux produced by the permanent magnets 28 flows through the magnetic hub 26 rather than the rotor poles 24, decreasing the EMF induced in the windings 14 and decreasing the voltage output from the brushless starter-generator assembly 1.

The control circuit 2 may include a detection circuit, such as a fault detection circuit 3, that monitors the brushless starter-generator assembly 1 to detect whether a characteristic of the brushless starter-generator assembly exceeds a predetermined threshold. For example, a fault detection circuit 3 may monitor an output voltage of the brushless starter-generator assembly 1 to determine whether the output voltage level V exceeds a fault level of voltage. In such a case, the control circuit 2 may shut down or decrease the power output from the excitation power supply 4 to the field coil 32 to reduce the voltage output from the brushless starter-generator assembly 1.

Although an embodiment has been described in which a voltage of the brushless starter-generator assembly 1 is monitored, the control circuit 2 may monitor any characteristic, such as an output EMF, current, temperature, vibration, or any other desired characteristic.

The control circuit 2 may include at least a processor including a comparator to compare a detected characteristic to a threshold, memory to store the threshold and a program to generate output signals to control power supplied to or generated from the brushless starter-generator assembly 1, an I/O ports connected to the brushless starter-generator assembly 1, and to any other device to interact with the control circuit 2.

Figure 9:
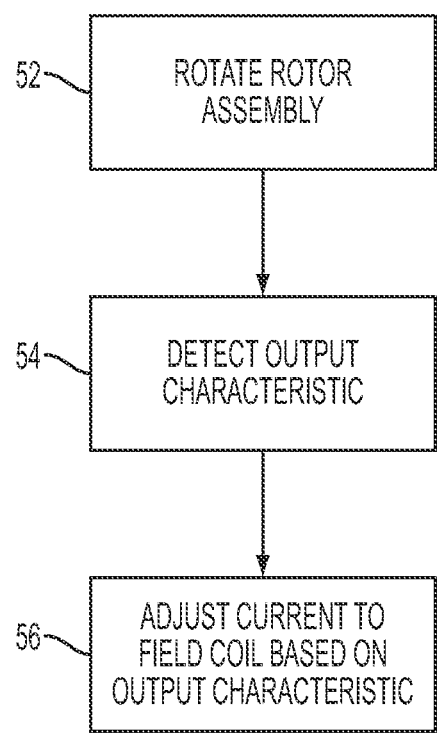
FIG. 9 is a flow diagram illustrating a method of controlling a brushless starter-generator assembly according to any of the embodiments of the present invention.

FIG. 9 illustrates a method of controlling the brushless starter-generator assembly 1 according to an embodiment of the invention.

In operation 52, the rotor 20 is rotated with respect to the stator assembly 10. The rotor 20 may be connected to a turbine or other driving system to drive the shaft 22 to rotate the rotor 20. In operation 54, a characteristic output from the brushless starter-generator assembly 1 is detected. The characteristic may be an output voltage or current, an EMF, vibration, temperature, or any other characteristic that provides information about the operation of the brushless starter-generator assembly 1.

In operation 56, current is adjusted to the field coil 32 based on the output characteristic. For example, referring to the system of FIG. 8 and the brushless starter-generator assembly 1 of FIG. 1, at start-up, a control circuit 2 may detect a low output voltage V, and may increase a current to the field coil 32 to increase the magnetic reluctance of the magnetic hub 26, and increase the EMF induced in the windings 14 of the stator 10. The voltage V may then increase to a desired operating voltage, and the control circuit 2 may monitor the voltage V and adjust the current to the field coil 32 to maintain a desired operating voltage.

If a fault detection circuit 3 detects a fault-level voltage, such as a short-circuit voltage, the control circuit 2 may shut off current to the field coil 32, increasing the magnetic permeability of the magnetic hub 26, and decreasing the EMF induced in the windings 14 to decrease or stop the voltage output from the brushless starter-generator assembly 1.

According the above-described embodiments, the EMF induced in the windings of a brushless starter-generator assembly, such as a brushless starter-generator, may be effectively controlled by regulating the permanent magnet flux produced in the rotor of the brushless starter-generator assembly, rather than in the stator. Regulating the magnetic flux of the permanent magnets of the rotor allows the brushless starter-generator assembly to operate at higher speeds, potentially generating a greater voltage relative to devices that regulate voltage or other characteristics of the stator. In addition, the above-described embodiments provide for a system and apparatus to shut off power from a brushless starter-generator assembly due to feeder cable short-circuits or other system faults, since shutting off power to the field coils reduces the voltage output from the brushless starter-generator assembly.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A brushless starter-generator assembly, comprising:
    a stator assembly comprising a stator stack, a magnetic sleeve located around an outer circumference of the stator stack, and a non-magnetic separator located between the stator stack and the magnetic sleeve;
    a rotor including a magnetic hub and disposed at least partially within the stator assembly, the rotor configured to rotate about an axis; and
    a field coil surrounding a portion of the stator assembly and located radially outward from the rotor with respect to the axis, the field coil including first and second field coils within an axial width of the stator stack in a direction of the axis, the first and second field coils spaced apart from each other in the direction of the axis,
    wherein the magnetic hub has a magnetic permeability that decreases based on a strengthening of a magnetic field generated by the field coil.

2. The brushless starter-generator assembly of claim 1, wherein the field coil includes first and second field coils surrounding two regions of stator stack in a direction of the axis, and
    the magnetic sleeve includes radial portions located on outer sides of the first and second field coils, respectively, with respect to a center of the stator stack in the direction of the axis.

3. The brushless starter-generator assembly of claim 2, wherein outer circumferences of the first and second field coils contact an inner circumference of the magnetic sleeve.

4. The brushless starter-generator assembly of claim 1, wherein outer circumferences of the first and second field coils contact an inner circumference of the non-magnetic separator.

5. The brushless starter-generator assembly of claim 1, wherein the first and second field coils are embedded within the stator stack.

6. The brushless starter-generator assembly of claim 1, wherein the field coil is located within the stator stack at a longitudinal center of the stator stack.

7. The brushless starter-generator assembly of claim 6, wherein an outer circumference of the field coil contacts an inner surface of the non-magnetic separator.

8. The brushless starter-generator assembly of claim 1, wherein the rotor comprises:
a shaft that rotates about the axis;
rotor poles fixed with respect to the shaft; and
permanent magnets fixed with respect to the rotor poles,
wherein the magnetic hub is located between the permanent magnets and the shaft.

9. The brushless starter-generator assembly of claim 1, wherein the field coil is configured to increase a magnetic saturation of the magnetic hub when a current is applied to the field coil.

10. The brushless starter-generator assembly of claim 1, wherein the field coil is an O-shaped coil centered about the axis and surrounding the axis.

11. The brushless starter-generator assembly of claim 1, further comprising:
a housing fixed with respect to the stator; and
bearings to support the magnetic hub with respect to the housing.

12. The brushless starter-generator assembly of claim 11, wherein the housing and the stator stack have a substantially cylindrical shape.

13. A system comprising:
a brushless starter-generator assembly having a stator assembly comprising a stator stack, a magnetic sleeve located around an outer circumference of the stator stack, and a non-magnetic separator located between the stator stack and the magnetic sleeve, the brushless starter-generator assembly further including a rotor including a magnetic hub, the rotor configured to rotate about an axis, and a field coil located radially outward from the rotor assembly with respect to the axis, the field coil including first and second field coils within an axial width of the stator stack in a direction of the axis, the first and second field coils spaced apart from each other in the direction of the axis; and
a control circuit to control a current supplied to the field coil, the current supplied to the field coil controlling a magnetic field generated by the field coil, and the magnetic filed field generated by the field coil controlling a magnetic permeability of the magnetic hub.

14. The system of claim 13, wherein the control circuit includes a detection circuit to detect a characteristic of the brushless starter-generator assembly, and
the control circuit is configured to adjust the current to the brushless starter-generator assembly when the characteristic detected passes a predetermined threshold.

15. The system of claim 14, wherein the detection circuit is a fault detection circuit, and
the predetermined threshold is a voltage corresponding to a short-circuit.

16. The system of claim 13, further comprising an excitation power supply connected to the field coil,
wherein the control circuit controls the current supplied to the field coil by controlling the output of the excitation power supply.

17. The system of claim 13, wherein the rotor of the brushless starter-generator assembly comprises:
a shaft to rotate about the axis;
rotor poles fixed with respect to the shaft; and
permanent magnets fixed with respect to the rotor poles,
wherein the magnetic hub is located between the permanent magnets and the shaft.

18. A method, comprising:
rotating a rotor about an axis with respect to a stator assembly to generate an electromagnetic field (EMF), the rotor including a shaft, permanent magnets rotating around the shaft, and a magnetic hub located between the shaft and the permanent magnets, wherein the stator assembly comprises a stator stack, a magnetic sleeve located around an outer circumference of the stator stack, and a non-magnetic separator located between the stator stack and the magnetic sleeve; and
adjusting power supplied to a field coil surrounding one or more portions of the stator assembly to adjust a magnetic reluctance of the magnetic hub, the field coil including first and second field coils within an axial width of the stator stack in a direction of the axis, the first and second field coils spaced apart from each other in the direction of the axis.

19. A brushless starter-generator assembly, comprising:
a stator assembly comprising a stator stack, a magnetic sleeve located around an outer circumference of the stator stack, and a non-magnetic separator located between the stator stack and the magnetic sleeve;
a rotor including a magnetic hub and disposed at least partially within the stator assembly, the rotor configured to rotate about an axis; and
a field coil surrounding a portion of the stator assembly and located radially outward from the rotor with respect to the axis, the field coil located within the stator stack at a longitudinal center of the stator stack,
wherein the magnetic hub has a magnetic permeability that decreases based on a strengthening of a magnetic field generated by the field coil.

* * * * *